Sept. 2, 1952     O. R. NEMETH     2,608,902
PICTURE VIEWING DEVICE
Filed May 2, 1950     2 SHEETS—SHEET 1
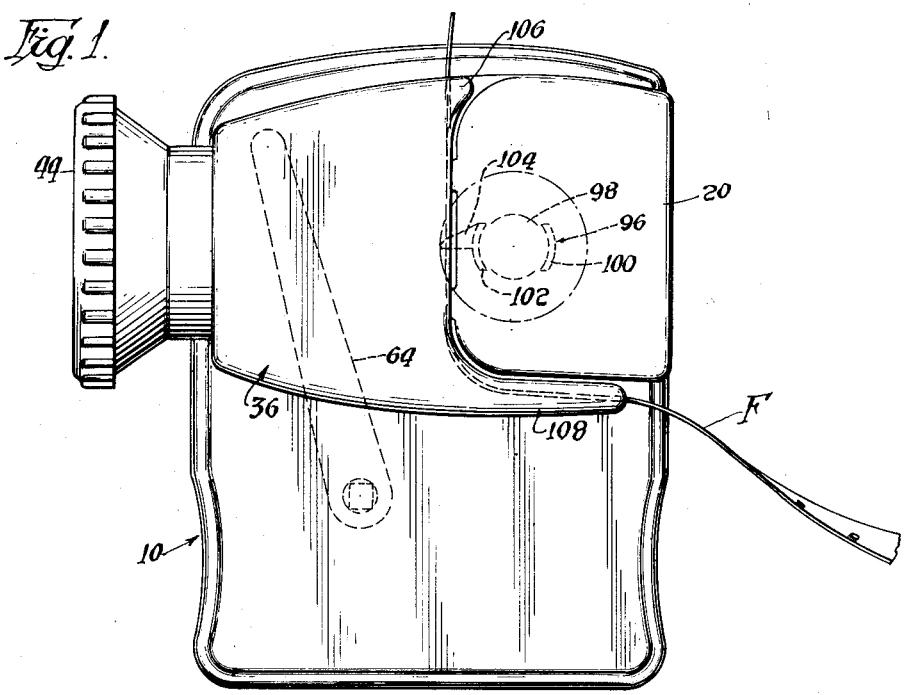
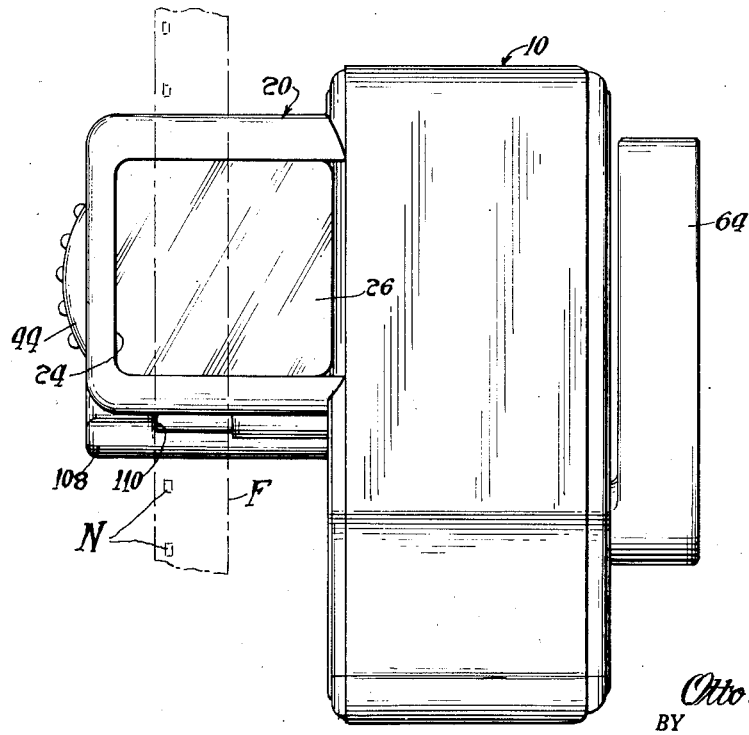
INVENTOR.
Otto R. Nemeth,
BY Wilfred E. Lawson
Attorney.

Sept. 2, 1952     O. R. NEMETH     2,608,902
PICTURE VIEWING DEVICE
Filed May 2, 1950     2 SHEETS—SHEET 2
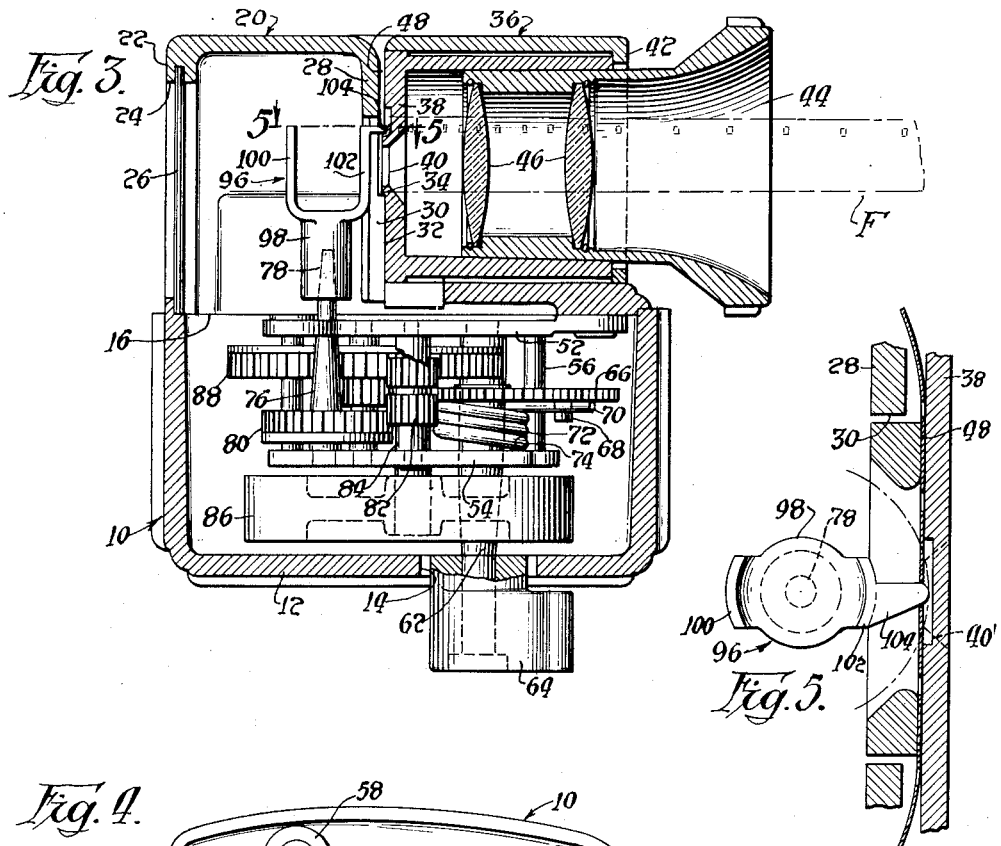
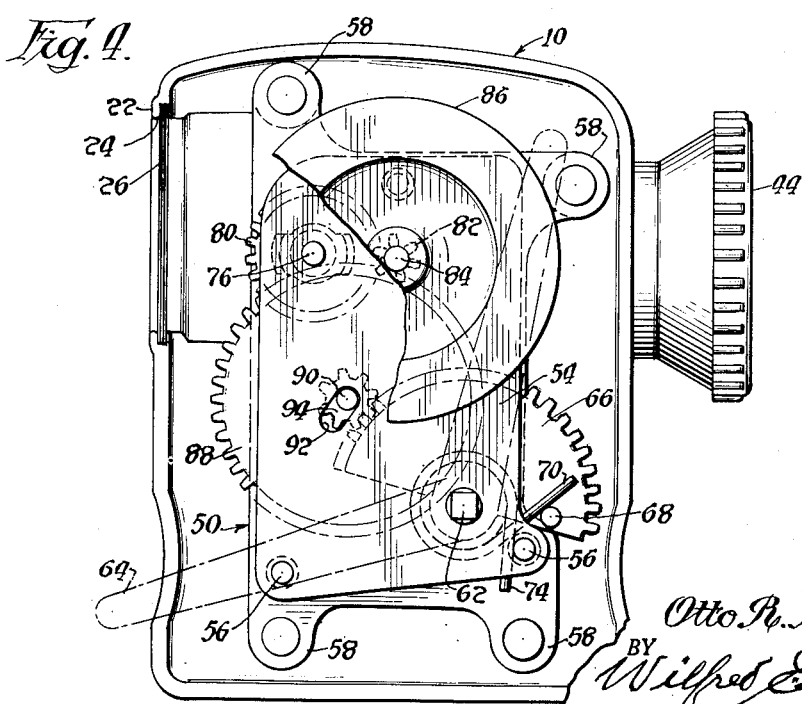
INVENTOR.
Otto R. Nemeth,
BY Wilfred E. Lawson
Attorney.

Patented Sept. 2, 1952

2,608,902

UNITED STATES PATENT OFFICE 2,608,902

PICTURE VIEWING DEVICE

Otto R. Nemeth, Los Angeles, Calif.

Application May 2, 1950, Serial No. 159,399

1 Claim. (Cl. 88—18)

This invention relates to a picture viewing device and more particularly to a viewing device by which a group of pictures on a strip of film may be inspected.

The primary object of this invention is to enable pictures on a strip of film to be viewed without requiring the use of a projector.

Another object is to render the pictures visible without requiring the use of any but natural illumination and to produce a device which is portable and which is manually operable so as to avoid any use of electrical energy.

The above and other objects may be attained by employing among its features a viewing chamber, a lens house mounted adjacent said viewing chamber and forming with said chamber a passage through which passes the film bearing the pictures to be viewed.

Other features include a rotary shutter mounted in the viewing chamber, means on the shutter for engaging the film and advancing it through the passage and a spring driven motor mounted adjacent the viewing chamber and connected to the shutter for rotating it.

Still other features include a spring motor having a spring driven toothed quadrant, a hand lever connected to the quadrant for moving it against the effort of the spring to load the spring, a gear train in the motor connected to the shutter for rotating said shutter and means in said motor and actuated by the quadrant for disconnecting said gear train from said quadrant during the loading of the spring and connecting said gear train with said quadrant during the movement of the quadrant under the influence of the spring.

In the drawings:

Figure 1 is a side view of a picture viewing device embodying the features of this invention;

Figure 2 is an end view of the device shown in Figure 1;

Figure 3 is a horizontal sectional view through the device;

Figure 4 is a vertical sectional view through the device; and

Figure 5 is an enlarged fragmentary vertical sectional view taken substantially along the line 5—5 of Figure 3.

Referring to the drawings in detail a substantially rectangular motor housing designated generally 10 has formed in one side wall 12 thereof an opening 14 and in its opposite side wall 16 an opening 18. Carried by the housing 10 and projecting outwardly from the side wall 16 thereof is a viewing chamber designated generally 20 having an open side which communicates with the interior of the motor housing 10 through the opening 18. The end wall 22 of the viewing chamber 20 is formed with an enlarged window opening 24 which is closed by a ground glass plate 26 through which light is admitted to the interior of said viewing chamber 20. Formed in the wall 28 of the viewing chamber 20 opposite the wall 22 thereof is an elongated horizontal slot 30 which opens through the edge of the wall 28 adjacent the wall 16 of the motor housing 10. The outer side of the wall 28 is thickened as at 32 to form a spacer having shoulder 34 which lies in spaced relation to the outer end of the slot 30 and forms a film guide.

Carried by the wall 16 on the outer side thereof and in abutting relation to the thickened portion 32 of the wall 28 is a lens house designated generally 36 and formed in the end 38 of the lens house adjacent the receiving chamber 20 is a framing opening 40 which aligns axially with the screen 26 through the slot 30. Entering the end wall 42 of the lens house 36 remote from the framing opening 40 is an eyepiece 44 carrying a conventional lens system 46 through which the screen 26 is visible. As shown in Figure 3 the lens house 36 is held in spaced relation with the viewing chamber 20 by the thickened portion 32 of the wall 28 so as to form a narrow passage 48 through which is moved the film to be inspected.

Mounted in any suitable manner on the wall 16 within the motor housing is a spring actuated drive motor designated generally 50. This drive motor embodies a pair of plates 52 and 54 held in spaced parallel relation by studs 56 and in the preferred form of the invention the plate 52 is provided on its perimeter with outstanding ears 58 through which rivets 60 are extended into and through the wall 16. Mounted for rotation in axially aligned openings in the plates 52 and 54 is a shaft 62 which projects beyond the outer side of the plate 54 and through the opening 14 in the wall 12 of the motor housing 10. A hand lever 64 is mounted on the outer end of the shaft for rotation therewith and extends radially therefrom so as to move in an arc that lies concentric with the axis of the shaft 62. Fixed to the shaft 62 between the plates 52 and 54 is a toothed quadrant 66 which has projecting from the side thereof adjacent the plate 54 a stud 68 against which bears a leg 70 carried by one end of a coiled spring 72. This spring 72 encircles the shaft 62 between the quadrant 66 and the plate 54, and carried by the end of said spring 72 adjacent the plate 54 is a radial leg 74. This leg 74 of the spring 72 bears against a stud 56 adjacent the shaft 62. It will thus be seen that when the hand lever 64 is moved in a counterclockwise direction the spring 72 will be loaded so as to urge the quadrant 66 to rotate in a clockwise direction.

Mounted in the plates 52 and 54 to rotate therebetween near the corners thereof diagonally opposite the shaft 62, is a shaft 76 which lies parallel to the shaft 62. This shaft extends through the plate 52 and carries at its end a conical spindle 78 which projects through the opening in the wall 16 and into the viewing chamber between the slot 30 and plate 26. The axis of the shaft 76 and the conical spindle 78 intersects the line of vision between the picture framing aperture 40 of the lens house 36 and the ground glass plate 26. Fixed to the shaft 76 for rotation therewith between the plates 52 and 54 is a drive gear 80 which has meshing engagement wiht a drive pinion 82 carried by a shaft 84 which is mounted for rotation in the plates 52 and 54. One end of the shaft 84 projects through the plate 54 and has secured thereto a flywheel 86. Meshing with the pinion 82 to the side of the gear 80 adjacent the plate 52 is a drive gear 88 which is mounted on a shaft 90 opposite ends of which are mounted in registering arcuate slots 92 formed in the plates 52 and 54. A drive pinion 94 is fixed to said shaft 90 between the plates 52 and 54 and has meshing engagement with the teeth on the quadrant 66. Owing to the fact that the slots 92 lie substantially concentric with the axis of the shaft 62, it will be seen that when the quadrant 66 is moved in a counterclockwise direction the shaft 90 will move in the slots 92 to disengage the drive gear 88 from the pinion 82 and thus enable the spring 72 to be loaded. On the other hand when the quadrant 66 starts to move in a clockwise direction under the influence of the spring 72, the shaft 90 will be moved by the pinion 94 in a clockwise direction to re-engage the gear 88 with the pinion 82. In this way the energy stored in the spring 72 will be transmitted to the spindle 78 and cause it to rotate in the viewing chamber 20.

Mounted on the spindle 78 for rotation thereby is a barrel type shutter designated generally 96 which comprises a socket 98 in which the conical spindle 78 is received, and a pair of diametrically spaced arms 100 and 102 which project in spaced parallel relation from the end of the socket 98 remote from that receiving the spindle 78. A laterally extending film moving finger 104 is carried by the arm 102 adjacent the end thereof remote from the socket 98 and the end of this finger 104 remote from the arm 102 moves in a circular path which intersects the passage 48 to one side of the picture framing opening 40.

The outside of the lens house 36 is provided at its end adjacent the viewing chamber 20 adjacent the side thereof remote from the motor housing with a projection 106 beside which passes a film F as it enters the passage 48 preparatory to passing across the framing opening 40. A guide arm 108 is carried by the lens house adjacent the lower rear corner thereof and extends beneath the viewing chamber 20. This guide arm is equipped between opposite sides with a shallow groove 110 which diminishes in depth as the lens house 36 is approached and which forms a guide channel for maintaining the alignment of the film F in its movements through the same and the guide slot 30.

In use film F to be inspected is entered into the passage 48 between the lens house 36 and the viewing chamber 20 so that it will pass between the framing opening 40 and the shutter 96. With the film thus started through the device, the lever 64 is moved in a counterclockwise direction; thus rocking the quadrant 66 in a counterclockwise direction and loading the spring 72.

During such movement of the quadrant 66 the pinion 94 carried by the shaft 90 will cause said shaft to move bodily in the slots 92 and hence shift the gear 88 away from and out of meshing engagement with the pinion 82. As soon as the hand lever 64 is released, the quadrant 66 starts to move in a clockwise direction thus bodily moving the pinion 94, the shaft 90 and the gear 88 upwardly in a clockwise direction about the axis of the shaft 62 and causing said gear 88 to mesh with the pinion 82 so as to impart rotary motion to the shaft 84, flywheel 86 and drive gear 80 of the shutter 96. Hence the shutter 96 will be rotated within the viewing chamber 20 and the finger 104 moving in its arcuate path will engage the notches N in the film F to intermittently advance said film through the passage 48 and between the framing opening 40 and the slot 30 so that by looking through the eyepiece 44 the pictures on the film may be seen. The illumination for the pictures on the film is supplied through the ground glass plate 26 in the window opening 24.

While in the foregoing there has been shown and described the preferred form of this invention, it is to be understood that minor changes in the details of construction, combination and arrangement of parts may be resorted to without departing from the spirit and scope of the invention as claimed.

What is claimed is:

In a motion picture film viewing device, a vertically elongated motor housing, a spring motor within said housing, means extending through a side wall of said housing for winding the spring of the motor, a viewing chamber carried on the side of the housing opposite from said spring winding means and adjacent its upper end, a rotary shutter mounted within said chamber and having a driving connection with said motor, a lens house carried by said housing in transverse alignment with respect to said chamber and in closely spaced relation thereto to provide a film passage therebetween, said chamber and said house having aligned openings in the adjacent side walls thereof, an eye-piece including a lens system adjustably mounted in the outer side wall of said house and in line with the opening in the opposite inner side wall thereof, a ground glass window in the outer side wall of said chamber in centered relation with respect to the opening in the opposite inner side wall of the same, means carried by said shutter and operable through an opening in the said inner wall of the chamber, at one side of the first opening therein, for engaging the perforations of the film to advance the film through the said passage, and a guide arm carried by the lower side of said house and projecting rearwardly beneath said chamber and having a film guiding channel in the same for maintaining the alignment of the film in its movements therethrough and through the said passage.

OTTO R. NEMETH.

REFERENCES CITED

The following references are of record in the file of this patent:

UNITED STATES PATENTS

| Number | Name | Date |
|---|---|---|
| 806,644 | Coxen | Dec. 5, 1905 |
| 1,384,135 | Karamanous | July 12, 1921 |
| 1,563,394 | Owens | Dec. 1, 1925 |
| 1,564,722 | Tauern et al. | Dec. 8, 1925 |
| 1,639,702 | Porak | Aug. 23, 1927 |
| 1,876,845 | Bowen et al. | Sept. 13, 1932 |
| 1,973,477 | Fritts | Sept. 11, 1934 |
| 1,997,642 | Klein | Apr. 16, 1935 |
| 2,122,804 | Tichenor | July 5, 1938 |
| 2,142,606 | Debrie | Jan. 3, 1939 |
| 2,490,920 | Rosman | Dec. 13, 1949 |

FOREIGN PATENTS

| Number | Country | Date |
|---|---|---|
| 304,603 | Great Britain | Nov. 7, 1929 |